UNITED STATES PATENT OFFICE.

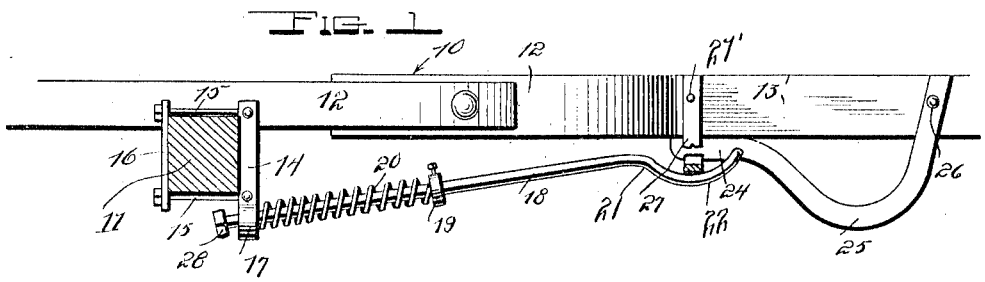
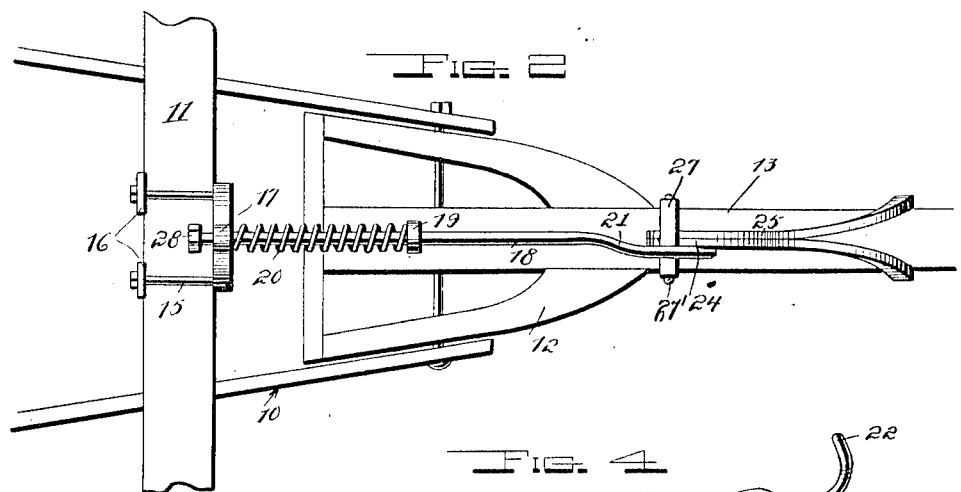
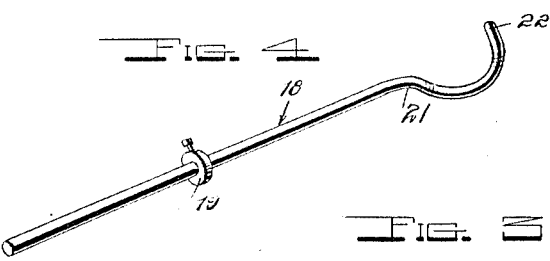
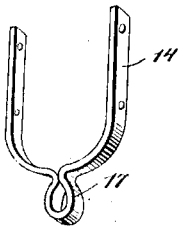
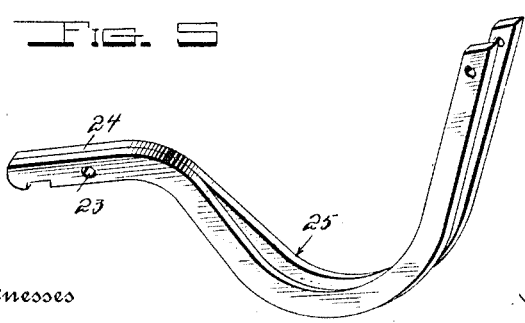

THEOPHIL H. SHAPPY, OF ROANOKE, ILLINOIS.

WAGON-TONGUE SUPPORTER.

1,079,189.   Specification of Letters Patent.   Patented Nov. 18, 1913.

Application filed April 1, 1912. Serial No. 687,761.

*To all whom it may concern:*

Be it known that I, THEOPHIL H. SHAPPY, a citizen of the United States, residing at Roanoke, in the county of Woodford, State of Illinois, have invented certain new and useful Improvements in Wagon-Tongue Supporters; and I do hereby declare the following to be a full, clear, and exact description of the invention, such as will enable others skilled in the art to which it appertains to make and use the same.

This invention relates to new and useful improvements in wagon tongue supporters.

An object of this invention is the provision of an adjustable device which is adapted to be attached to the axle of a wagon, for engagement with the tongue thereof to hold the latter in any desired raised position, the said device being so constructed that it can be operated to permit the tongue to be lowered when the wagon is not in use, or when dumping.

A further object of this invention is to improve and simplify devices of this character, rendering them comparatively simple and inexpensive to manufacture, reliable and efficient in use and readily operated.

With the above and other objects in view, this invention resides in the novel features of construction, formations, combinations and arrangements of parts to be hereinafter more fully described, claimed and illustrated in the accompanying drawings, in which:

Figure 1 is a fragmentary portion of a vehicle illustrating my device applied thereto. Fig. 2 is a bottom plan view thereof. Fig. 3 is a detailed perspective view of the axle bracket. Fig. 4 is a detailed perspective view of the spring actuated supporting rod, and Fig. 5 is a detailed perspective view of the tongue engaging bracket.

Referring to the accompanying drawings, by similar characters of reference throughout the several views, the numeral 10 designates generally a portion of the front of a vehicle in which is shown the front axle 11, hounds 12 and tongue 13 which is pivotally connected to the hounds.

A U-shaped axle bracket 14 is located with its opposite legs resting against the forward side of the axle 11 in which position it is rigidly held against displacement by the bolts 15 which engage the openings formed in the legs of the said bracket 14 and have their opposite ends extending through and retained against displacement in suitable apertures formed in the opposite ends of the plates 16 which bear against the rear side of the said axle 11.

The bight of the U-shaped bracket 14 is formed with a depending eye 17 in which is slidably located a supporting rod 18.

An adjustable collar 19 is located upon the rod 18 while a coil spring 20 surrounds the said rod and bears at its opposite terminals against the confronting faces of the said collar 19 and eye 17, and serves to normally force the rod 18 forwardly.

The front extremity of the rod 18 is offset as at 21, to produce a lateral extension which extends transversely to the rod 18 as at 22 and which is adapted to be pivotally engaged within an opening 23 formed in the rear extremity of an arm 24 provided upon a rearwardly curved bracket 25 which is bifurcated at its upper end to engage the opposite sides of the tongue 13 to which it is bolted or otherwise pivotally secured as designated by the numeral 26.

A guide 27 is pivotally suspended from the tongue 13 in the rear of the connection between said tongue and bracket and surrounds the arm 24 adjacent a notch formed in the under side thereof as clearly illustrated in the drawing.

It will be seen that the rod 18 and bracket 25 form the arms of a toggle lever. The tension of the spring 20 serves to force the arm 24, to which the rod 20 is pivotally connected, into engagement with the tongue 13 and yieldingly supports the tongue in a substantially horizonal position as will be readily understood. The bracket 27 serves to prevent any accidental displacement.

When it is desired to lower the tongue the guide 27 is swung toward the hounds 12 and clear of the arm 24. It will then be seen that, by lifting the tongue, three pivotal points are brought into alinement and the lever can be broken downwardly thus freeing the tongue from the spring and allowing it to lower. The same result can also be attained by forcing the connection between the rod 18 and bracket 25 downwardly against the action of the spring 20 until the three points are in alinement, when the lever can be broken as before.

A nut 28 is threaded upon the rear extremity of the rod 18 and serves to prevent the total disengagement thereof from the eye 17.

From the foregoing disclosures taken in connection with the accompanying drawings, it will be readily seen that a wagon tongue supporter is provided which will fulfil all of the necessary requirements of such a device.

Having thus fully described this invention what I claim as new and desire to protect by Letters Patent, is:—

1. The combination with a vehicle axle and tongue of a bracket secured to the axle, a rod pivotally slidable in said bracket, a bracket pivotally secured to the tongue, pivotal connections between the rod and last named bracket, a spring for forcing the rod outwardly to support the bracket and hold the tongue up and a pivoted guide for limiting the movement of the last named bracket.

2. The combination in a device such as described, with an axle and a vehicle tongue, of a bracket secured to said axle and provided with an eye, a bracket pivotally secured to said tongue and provided with a rearwardly extending apertured and slotted arm, a supporting rod slidable in the eye, a lateral extension formed thereon and projecting through the aperture located in the arm, a collar adjustable upon the rod, and a spring surrounding the rod and engaging the collar and eye for forcing the rod outwardly to support the bracket and hold the tongue up and a guide pivoted to the tongue and extending under the arm of the bracket adjacent the slot for limiting the movement of the slot.

In testimony whereof, I affix my signature, in presence of two witnesses.

THEOPHIL H. SHAPPY.

Witnesses:
GEORGE PARKIN,
JOHN ENGLAND.

Copies of this patent may be obtained for five cents each, by addressing the "Commissioner of Patents, Washington, D. C."